(12) United States Patent
Clausen

(10) Patent No.: US 7,864,662 B2
(45) Date of Patent: Jan. 4, 2011

(54) TELECOMMUNICATION SYSTEM AND METHOD

(75) Inventor: Axel Clausen, München (DE)

(73) Assignee: Lantiq Deutschland GmbH, Neubiberg (DE)

(*) Notice: Subject to any disclaimer, the term of this patent is extended or adjusted under 35 U.S.C. 154(b) by 1264 days.

(21) Appl. No.: 11/436,387

(22) Filed: May 18, 2006

(65) Prior Publication Data

US 2007/0268811 A1 Nov. 22, 2007

(51) Int. Cl.
*H04B 3/32* (2006.01)

(52) U.S. Cl. ...................................................... 370/210

(58) Field of Classification Search .................. 370/210
See application file for complete search history.

(56) References Cited

U.S. PATENT DOCUMENTS

| | | | |
|---|---|---|---|
| 6,965,657 | B1 | 11/2005 | Rezvani et al. |
| 2003/0086362 | A1 | 5/2003 | Hasegawa et al. |
| 2004/0218756 | A1* | 11/2004 | Tang et al. ................... 379/417 |
| 2005/0052988 | A1 | 3/2005 | Tsatsanis et al. |
| 2005/0089089 | A1* | 4/2005 | Anim-Appiah et al. ..... 375/232 |

OTHER PUBLICATIONS

M.L. Honig, K. Steiglitz, and B. Gobinath, "Multichannel signal processing for date communications in the presence of crosstalk", IEEE Transactions on Communications, vol. 38, No. 4, pp. 551-558, Apr. 1990 (8 pages).

J.A.C. Bingham, "Multicarrier Modulation for Data Transmission: An Idea whose Time Has Come", IEEE Communications Magazine, 28(5):5-14, May 1990, (10 pages).

A. Ruiz, J.M. Cioffi, and S. Kasturia, "Discrete Multiple Tone Modulation with Coset Coding for the Spectrally Shaped Channel", IEEE Transactions on Communications, 40:1012-29, Jun. 1992, (18 pages).

Chen, "The Development and Standardization of Asymmetrical Digital Subscriber Line", IEEE Communications Magazine, vol. 37, No. 5, pp. 68-72, May 1999, (5 pages).

* cited by examiner

*Primary Examiner*—Melvin Marcelo
(74) *Attorney, Agent, or Firm*—SpryIP, LLC

(57) ABSTRACT

An arrangement for use in a telecommunication system includes a binder of subscriber lines, a local transceiver circuit, and a far-end crosstalk cancellation circuit. Each of the subscriber lines ends at one of a plurality of remote user terminals. The local transceiver circuit is associated with the binder of subscriber lines and comprises a plurality of substantially identical transceiver modules, each of the transceiver modules being associated to one or a small number of subscriber lines. The far-end crosstalk cancellation circuit is configured to reduce far-end crosstalk between the subscriber lines of the binder, and is operably connected to interface with at least parts of the received data of the respective local transceiver modules. The far-end crosstalk cancellation circuit operable to implement a blind training algorithm for at least one victim subscriber line based on signals received by the respective associated transceiver modules.

15 Claims, 9 Drawing Sheets

TELECOMMUNICATION SYSTEM AND METHOD

BACKGROUND OF THE INVENTION

The invention relates to a telecommunication system and method, wherein a binder of subscriber lines extends between a switch and a plurality of user terminals and far-end crosstalk cancellation is provided.

Such system and method is provided in connection with xDSL-systems, offering broadband internet connections via existing telephone lines.

In existing xDSL-systems comprising binders of a large number of copper subscriber lines, the major disadvantage of significant crosstalk results in a limitation of the system performance and quality of broadband transmissions (QoS), in particular a limitation of the achievable data rates.

In FIG. 1, a typical structure of a state of the art telephone network is shown. At their respective origin in switches (central offices or cabinets, respectively) the telephone lines are part of large binders, which, with increasing distance from the origin, are more and more branched into smaller binders, until single telephone lines (or a very small binder) end at a single user (subscriber) and are connected to his transceiver terminal.

As a practical matter, there exists non-negligable crosstalk between the several lines where the lines are coiled in binders.

FIG. 2 is an illustration of the topology of such crosstalk for N Telephone lines. Numerals $CO_0$ to $CO_N$ represent the xDSL transmitting and receiving means in the central office or the cabinet, respectively. $CPE_0$ and $CPE_N$ represent xDSL modems of the users. The crosstalk has to be differentiated into near-end crosstalk (NEXT) and far-end crosstalk (FEXT).

It is a well-known physical phenomenon that, in principle, the achievable data rate of closely neighboured electrical subscriber lines may be limited by crosstalk. This is in particular valid for data transmission according to the most recent xDSL-Standard, since VDSL/VDSL2-systems use the frequency range up to 30 MHz, and crosstalk is considerably increased at such high frequencies. On the other hand, the channel losses are much higher at higher frequencies than at lower frequencies. This results in the effect that especially over relatively short transmission distances the achievable data rate is limited by the amount of crosstalk between the subscriber lines of a binder.

BRIEF SUMMARY OF THE INVENTION

At least some embodiments of the present invention address the foregoing issues by providing for an improved telecommunication system of the type comprising binders of subscriber lines, wherein the limiting effect of crosstalk phenomena on the system performance is reduced, and, as a consequence thereof, the achievable data rate is increased.

In an embodiment of the invention, an arrangement for use in a telecommunication system includes a binder of subscriber lines, a local transceiver circuit, and a far-end crosstalk cancellation circuit. Each of the subscriber lines ends at one of a plurality of remote user terminals. The local transceiver circuit is associated with the binder of subscriber lines and comprises a plurality of substantially identical transceiver modules, each of the transceiver modules being associated to one or a small number of subscriber lines. The far-end crosstalk cancellation circuit is configured to reduce far-end crosstalk between the subscriber lines of the binder, and is operably connected to interface with at least parts of the received data of the respective local transceiver modules. The far-end crosstalk cancellation circuit operable to implement a blind training algorithm for at least one victim subscriber line based on signals received by the respective associated transceiver modules.

In a further embodiment of the invention a telecommunication system is provided, comprising a binder of subscriber lines, each of the subscriber lines operably coupled to one of a plurality of remote user terminals, the system comprising far-end crosstalk pre-compensation means pre-compensating far-end crosstalk between the subscriber lines of the binder, wherein the local transceiver means, associated to the binder of subscriber lines, have a modular structure comprising a plurality of basically identical transceiver modules, each of the modules being associated to one or a small number of subscriber lines, wherein the far-end crosstalk pre-compensation means are associated to at least part of the local transceiver modules, and wherein interface means for interfacing at least parts of the transmitted data of the respective local transceiver modules with the far-end crosstalk pre-compensation means are provided, and wherein a blind training algorithm for at least one victim subscriber line is implemented for training the far-end crosstalk pre-compensation means with respect to signals transmitted by the respective associated transceiver modules and with information from the remote transceiver of the victim data channel.

Other systems, methods, features and advantages of the invention will be or will become parent to one with skill in the art upon examination of the following figures and detailed description. It is intended that all such additional systems, methods, features and advantages be included within this description, be within the scope of the invention, and be protected by the accompanying claims.

DETAILED DESCRIPTION OF THE INVENTION

Figure 1:
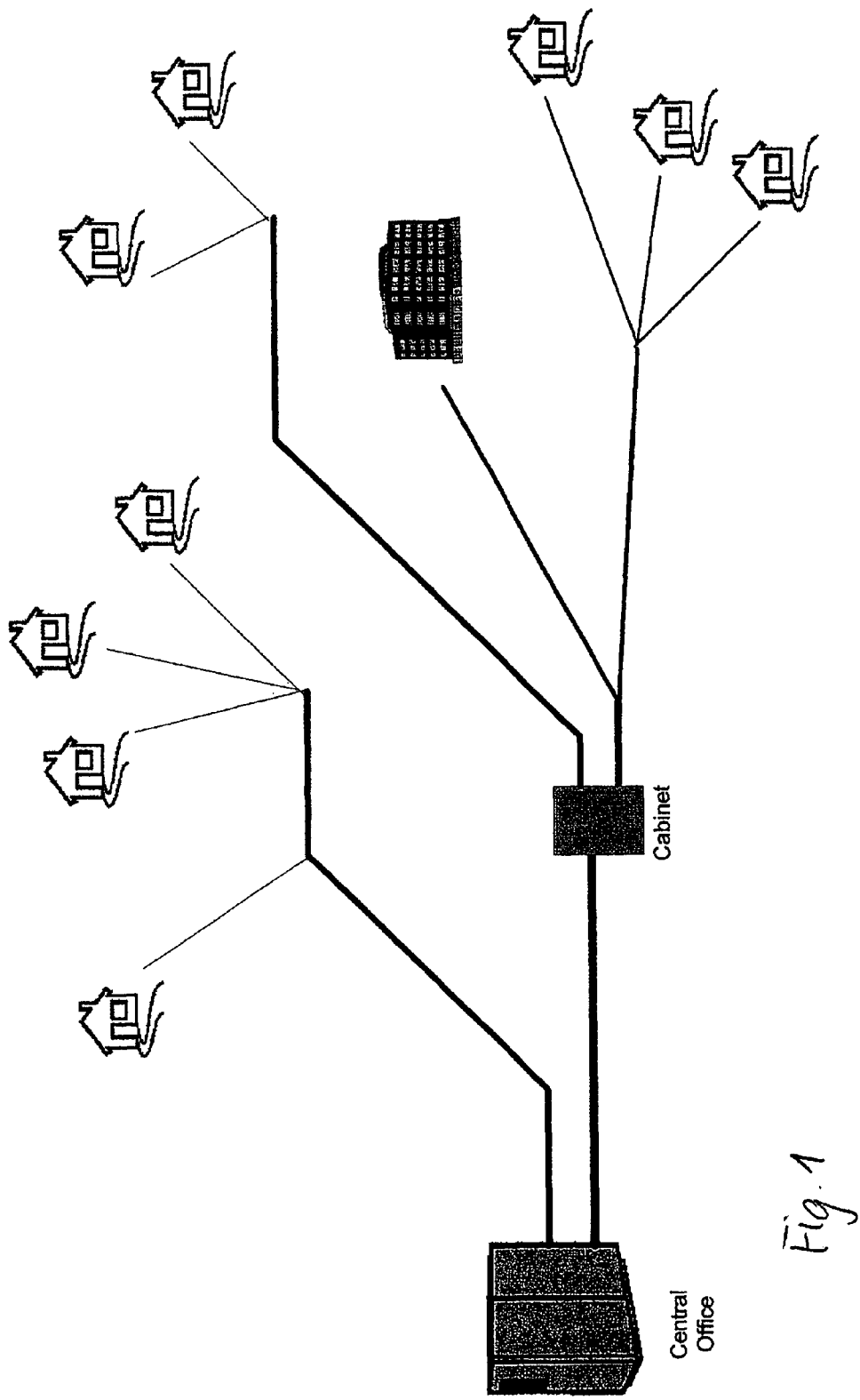
FIG. 1 shows a general structure of a portion of a wired telecommunication system.
Figure 2:
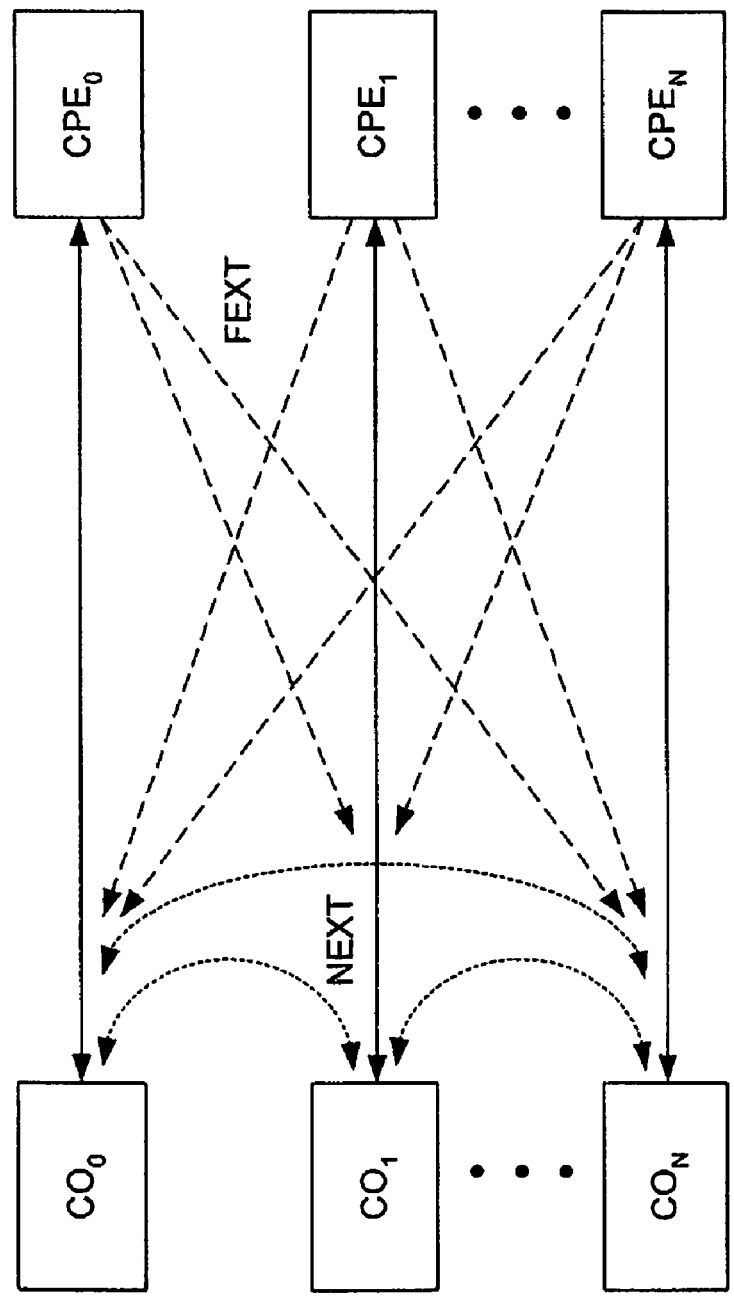
FIG. 2 is a view of the topology of crosstalk phenomena in a system according to FIG. 1.

As discussed above, one embodiment of the invention includes an arrangement for use in a telecommunication system comprising a binder of subscriber lines, each of the subscriber lines ending at one of a plurality of remote user terminals, the system comprising far-end crosstalk pre-compensation means pre-compensating far-end crosstalk between the subscriber lines of the binder, wherein the local transceiver means, associated to the binder of subscriber lines, have a modular structure comprising a plurality of basically identical transceiver modules, each of the modules being associated to one or a small number of subscriber lines, wherein the far-end crosstalk pre-compensation means are associated to at least part of the local transceiver modules, and wherein interface means for interfacing at least parts of the transmitted data of the respective local transceiver modules with the far-end crosstalk pre-compensation means are provided, and wherein a blind training algorithm for at least one victim subscriber line is implemented for training the far-end crosstalk pre-compensation means with respect to signals transmitted by the respective associated transceiver modules and with information from the remote transceiver of the victim data channel.

In an improvement to this embodiment, for pre-compensation of far-end crosstalk in a transmitted signal each of the transceiver modules at its output side comprises an Inverse Fast Fourier Transform Unit, the input of the inverse Fast Fourier Transform Unit being connected to a data output of the far-end crosstalk cancellation means.

In further embodiments of the invention, corresponding far-end crosstalk cancellation means are provided for improving the performance of a more general telecommunication system comprising a plurality of more general transmission channels.

Furthermore, in an embodiment of the invention a method of operating a telecommunication system is provided, the system comprising a binder of subscriber lines originating from a switch and ending at a plurality of user terminals, the method comprising a step of dedicated far-end crosstalk cancellation on predetermined selected subscriber lines of the binder, at the end of a switch and/or at the end of selected user terminals.

In a further embodiment, the system is an xDSL-type system, in particular a VDSL2 system, and the step of dedicated far-end crosstalk cancellation comprises an initial training of relevant correction coefficients during a Quiet Phase of the respective subscriber line. In a further embodiment, the step of dedicated far-end crosstalk cancellation comprises an update of relevant correction coefficients during reception of a synchronization symbol of the respective subscriber line.

Furthermore, advantageous embodiments of the invention provide for means for cancelling far-end crosstalk in a wired communication network, the means for cancelling far-end crosstalk being of a modular structure distributed over communication lines of the network, which communication lines are coiled to a binder at the end of a switch. Interface means for controlling the data transmission and operation of the cancellation means are associated to the latter.

Furthermore, the invention provides for a method of operating a wired data communication network, the method comprising far-end crosstalk cancellation associated to selected subscriber lines in a modular or distributed manner, respectively.

As becomes apparent from the above, different from conventional telecommunication systems, it is a basic idea of the invention to distribute the complexity of the transceiver system for a large binder of subscriber lines to a plurality of relatively independent modules, preferably providing for simple interfacing between the modules. Hence, the system is robust and may be trained during the normal initialization.

This system is economically advantageous insofar as it provides for a more flexible architecture, in correspondence to specific needs of the end users, as well as to specific technical requirements on the network operator's side. The system may be tailored both for end users which do not need or not wish to make advantage of the far-end cancellation and for users which wish to have the far-end crosstalk cancellation available. For both types of users a basic type of transceiver may be provided, which is only slightly more complex than a conventional transceiver, whereas for users who wish to make benefit of the far-end crosstalk cancellation a corresponding cancellation unit to the basis-type transceiver has to be added.

On the other hand, it is advantageous for the network operator that, if a number of users make benefit of the cancellation means, not all subscriber lines are influenced by far-end crosstalk or that not on all subscriber lines a VDSL-system is used. Since the cancellation units or modules, respectively, are separate from the xDSL transceivers, the network operator may, in a flexible way of operating the network, connect those subscriber lines to the cancellation module which actually experience the most prominent disturbance.

Figure 3:
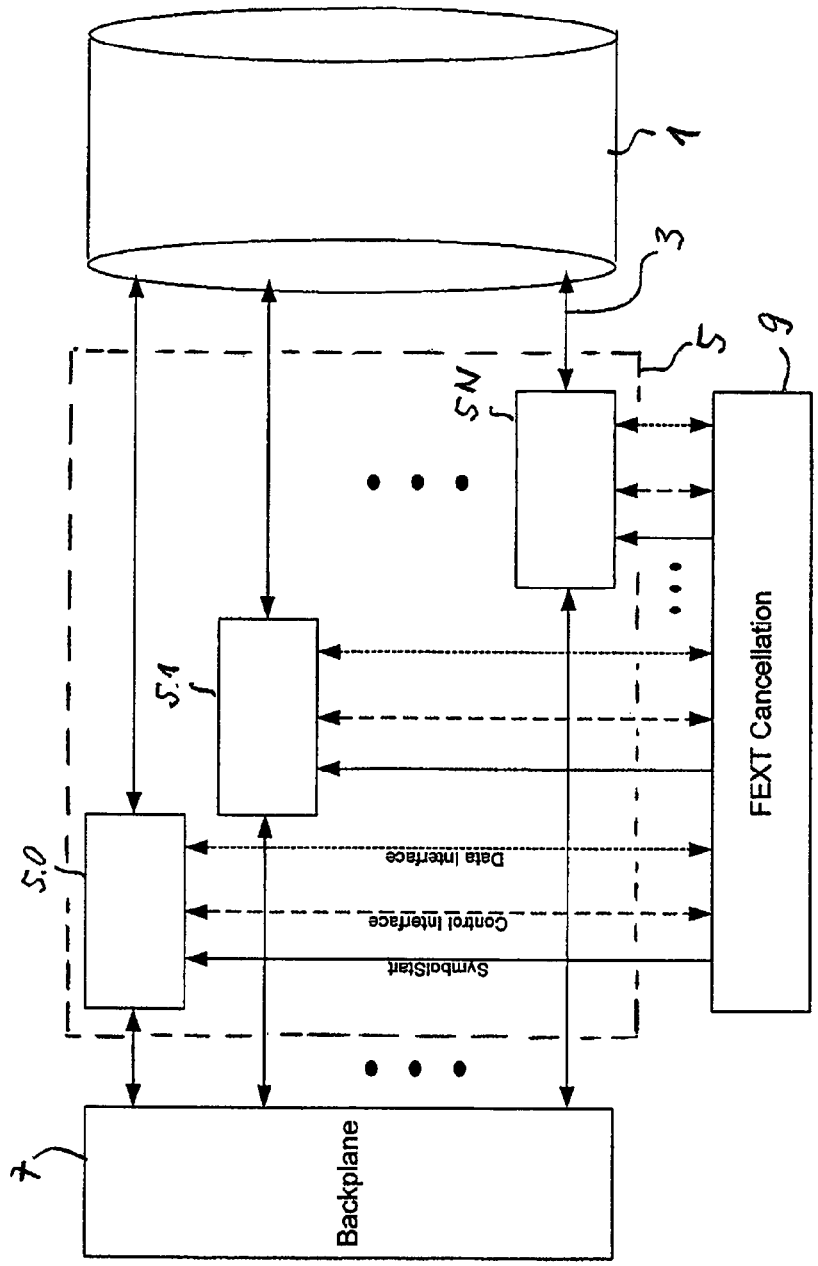
FIG. 3 is a view at the system architecture of a telecommunication system according to the invention, at the end of a switch.

FIG. 3 shows a system architecture of a first advantageous embodiment of the invention. A cable binder 1 comprising N subscriber lines 3 is, at the end of a cabinet (not shown here), connected to a transceiver device 5. The transceiver device 5 comprises N transceiver modules 5.0 to 5.N, each of them being connected to a backplane 7 on the one hand end to a far-end crosstalk cancellation block 9 on the other. In accordance with some embodiments of the invention, the transceiver modules 5.0 to 5.N, as well as the far-end crosstalk cancellation block 9, are provided as separate chip-integrated units, typically arranged and connected with each other on a printed circuit board. The arrangement of these modules may also be distributed over a number of circuit boards.

An interface between the xDSL transceiver modules 5.1 to 5.N and the far-end crosstalk cancellation block 9 comprises a data interface and a control interface, and optionally a connection for signalling the DMT-symbol start. In FIG. 3 the interface functions are symbolized by means of arrows between the respective transceivers and the overall far-end crosstalk cancellation block 9.

Figure 4:
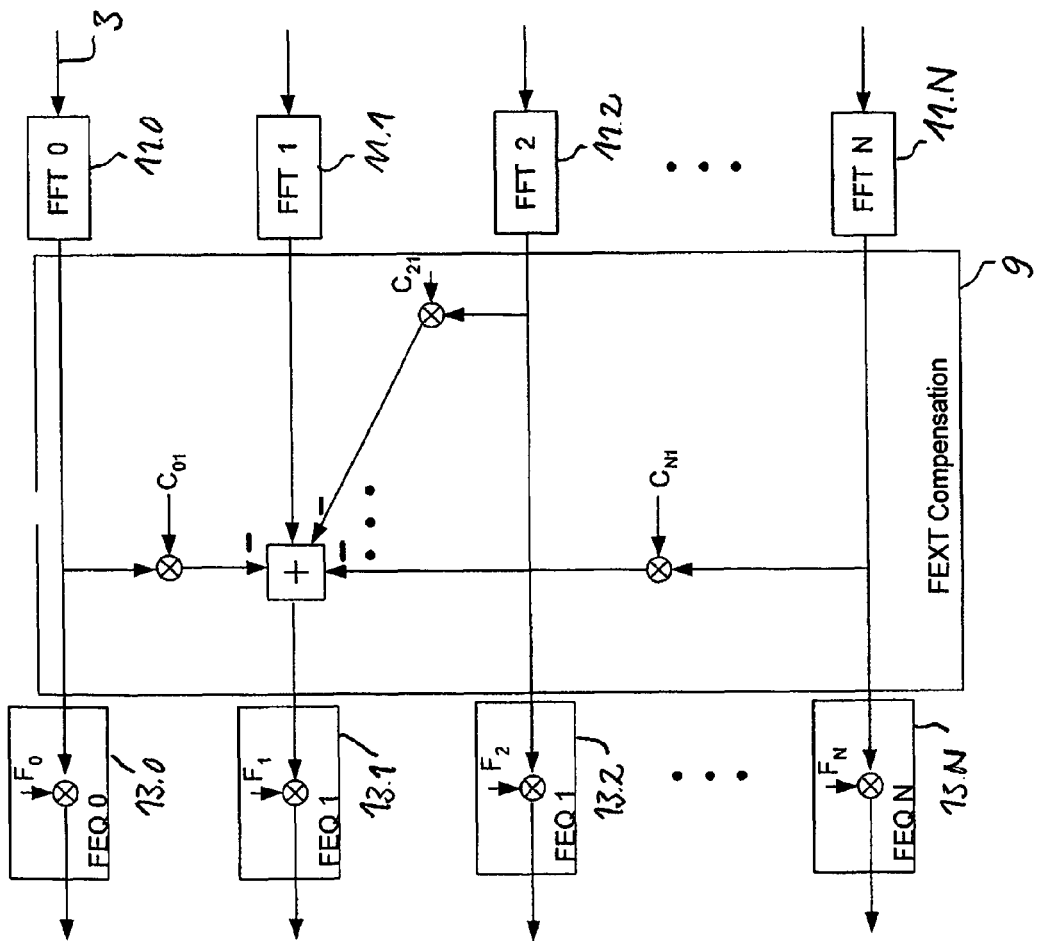
FIG. 4 is a view for explaining the operating principle of a far-end crosstalk cancellation compensator.

FIG. 4 shows the basic architecture of the far-end crosstalk cancellation block 9. The details of the cancellation block 9 for one of the subscriber lines corresponding to transceiver module 5.1 (see FIG. 3) are shown in detail. Details regarding other subscriber lines are omitted from FIG. 4 for purposes of clarity of exposition, but may suitably be analogous to those shown for the subscriber line corresponding to the transceiver line 5.1.

Notwithstanding the foregoing, some detail regarding all of the subscriber lines 3 is provided in FIG. 4 for purposes of context. In particular, each of the subscriber lines 3 comprises a Fast Fourier transform unit 11.0 to 11.N and a frequency-domain equalizer unit 13.0 to 13.N. Far-end crosstalk cancellation is provided between these well-known functional units. The crosstalk cancellation block (crosstalk compensator) 9 obtains output data from the FFT units 11.0 to 11.N.

For each of the lines 3 that undergoes a crosstalk compensation, for any tone the FFT output has to be weighed with a complex coefficient and subtracted from the corresponding line. This is, for line 1, as exemplified in the figure, achieved by means of respective multipliers C01, C21, . . . , CN1. After this processing, as in conventional systems without far-end crosstalk cancellation, frequency range deemphasizing is provided, by the frequency domain-equalizer units 13.0 to 13.N. The detailed architecture of the far-end crosstalk cancellation block 9 as such is of a conventional type.

The data interface as shown in FIG. 3 transmits all or part of the output data of the corresponding FFT unit from the DSL component to the compensation component, or the compensated data are re-transmitted to the DSL component, respectively. The control interface of FIG. 3 transmits information regarding the signal type (SyncSymbol, QuietPhase, . . . ), as well as the information whether an initial training or an adaptation during the date transmission shall be executed.

It is an important precondition for the far- and crosstalk cancellation, to ensure a parallel start of the DMT symbols in all of the DSL transceiver modules, which is called "Synchronized digital duplexing". This parallel symbol start can either be controlled in an autonomous manner between the DSL components, or a start pulse is being sent from the compensation component to all DSL transceiver modules.

Figure 5:
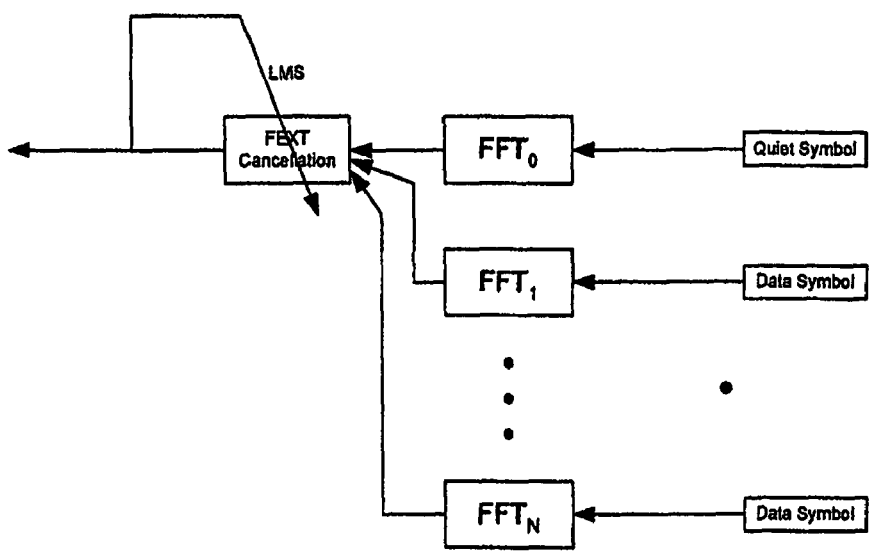
FIG. 5 is a view explaining the initial training principle of the far-end crosstalk cancellation means.

An initial training is provided during a phase in which a modem (not shown) connected to the line does not transmit any signal, the so-called Quiet Phase. At the modem of the switch during such phase on this line only noise and cross-talk from the other lines is detected. It is important that this phase only happens when the amplifications in the reception path of the switch modems have been calibrated. The VDSL2 Standard defines a Quiet Phase (R-P-Quiet 3) which fulfils this condition and may be used for the purpose under discussion. FIG. 5 schematically shows this status/procedure.

The training may then be carried out with a conventional least-mean-squared (LMS) algorithm or modifications thereof, as e.g. the sign-LMS algorithm or the sign-sign-LMS algorithm.

Figure 6:
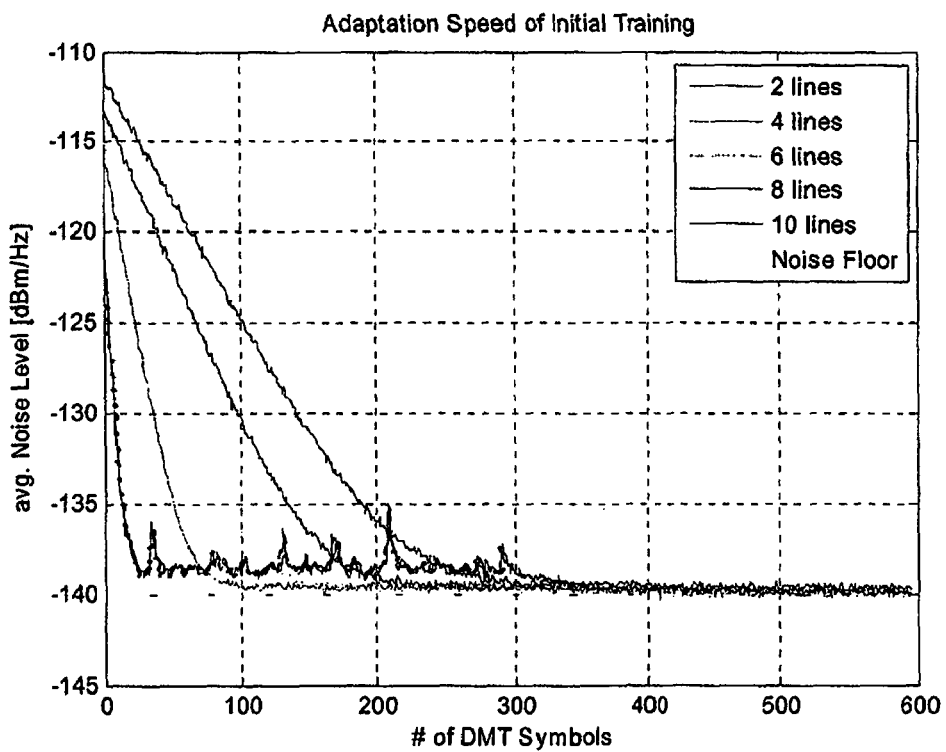
FIG. 6 is a graph illustrating the functional relationship between noise level and number of the empty symbols for several numbers of subscriber lines to be crosstalk compensated.

FIG. 6 graphically illustrates, by means of an example, the adaptation speed of the LMS algorithm. In this figure, the different line types are for symbolising different numbers of lines to be compensated. Pure noise, without crosstalk components, is shown as a dotted line.

From the figure, it may easily be derived that even with 9 lines to be compensated the algorithm converges after 300 symbols. The above mentioned R-P-Quiet 3 Phase is up to 17.344 symbols long. Although this Quiet-Phase shall in principle, also be used for the training of a time-domain equalizer and echo cancellation block, it is well usable for the far-end crosstalk cancellation training. The reason is that on comparatively short lines, for which the far-end crosstalk cancellation is interesting, such further blocks are not needed.

In DSL systems the data transmission phase is usually called "Showtime". During such phase, as a matter of fact, no Quiet-Phase, as in the initial training, does exist. Therefore, another method has to be applied to adapt the coefficients.

FIG. 6 schematically shows this procedure. The coefficients of the line under discussion are then being adapted when on this line a SyncSymbol is being sent. Incidentally, according to the VDSL2 Standard after respective 255 symbols the SyncSymbol is sent. This SyncSymbol is estimated at the receiver, and the estimate is subtracted from the error signal, in advance of using an LMS algorithm to adapt the corresponding coefficients.

Figure 7:
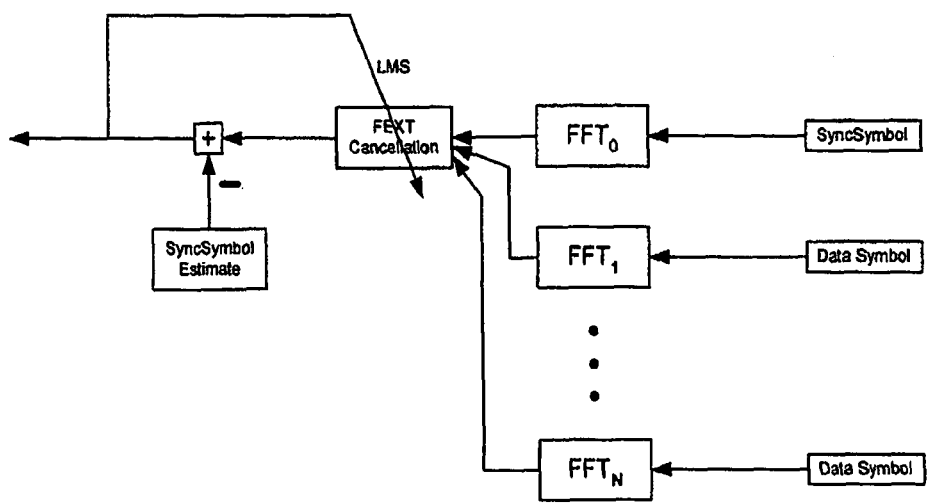
FIG. 7 is a view for explaining the principle of crosstalk cancellation means adaptation during data transmission.
Figure 8:
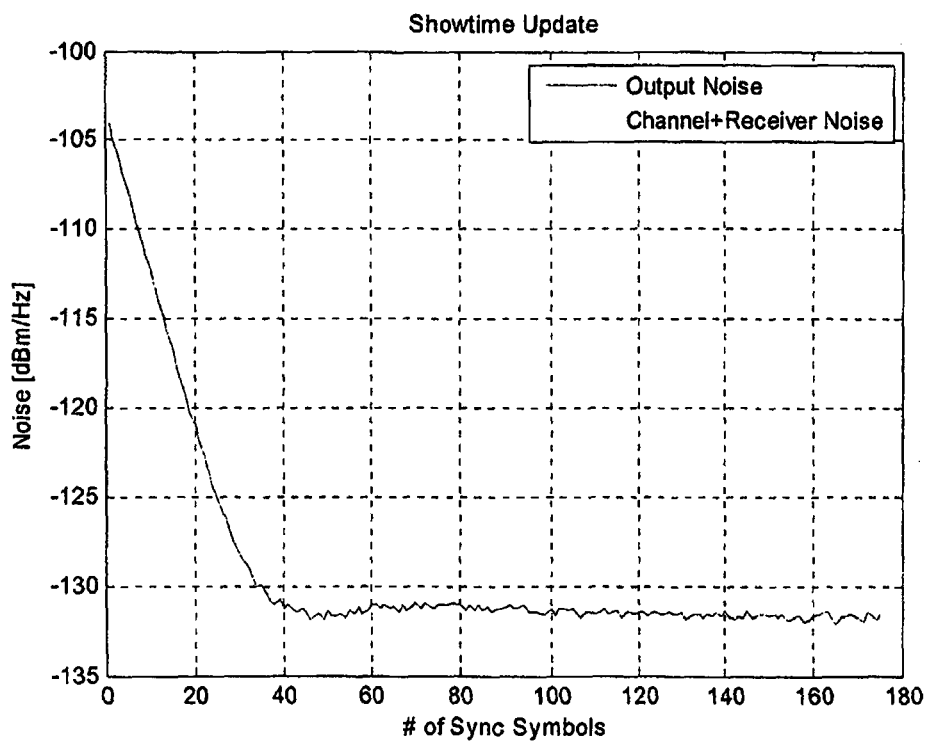
FIG. 8 is a graph showing the functional relationship between noise and number of sync-symbols, for explaining the adaptation speed during data transmission.

FIG. 7 serves for illustrating the adaptation speed of the LMS algorithm during the data transmission. The adaptation as shown there becomes necessary in so far as on a previously non-used line a VDSL connection has been started.

Figure 9:
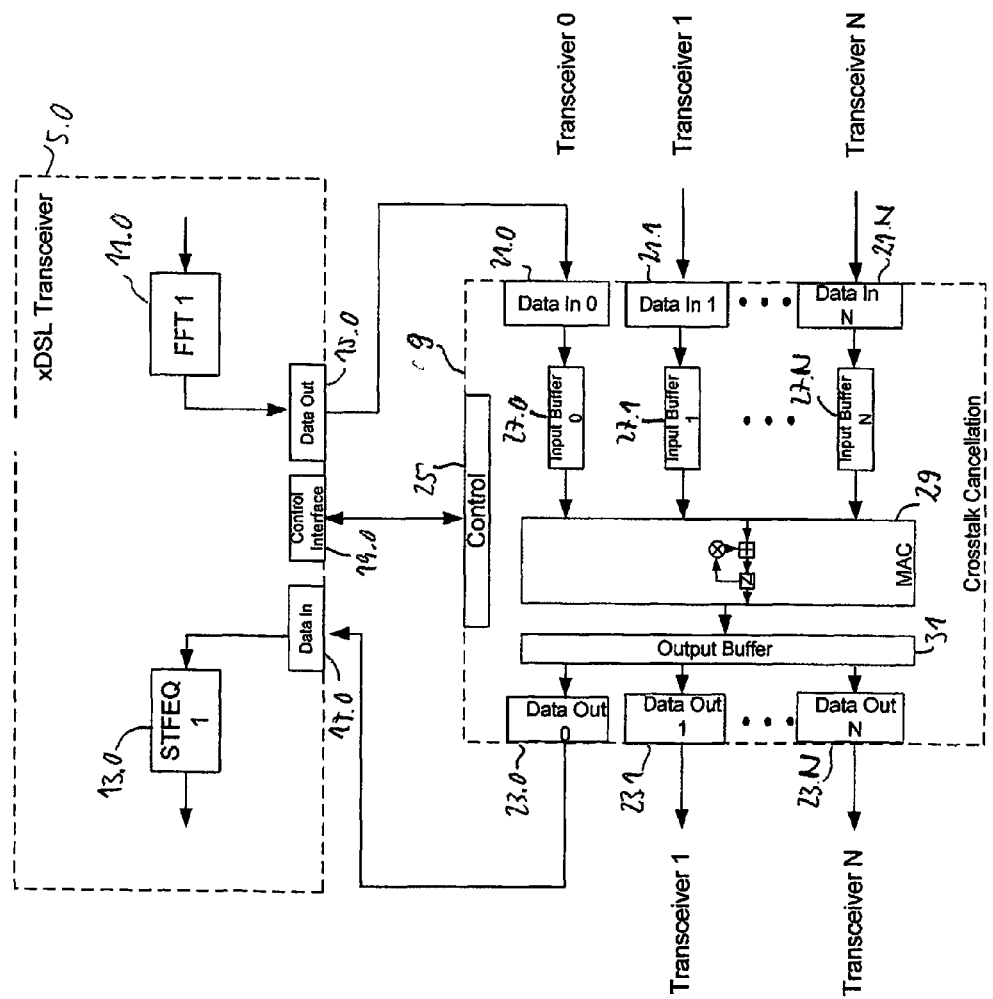
FIG. 9 is a view of an advantageous system architecture.

FIG. 9 is a more detailed illustration of a preferred system architecture according to the invention, intentionally using a display mode which deviates from the mode as used in FIG. 3 or FIG. 4. Nevertheless, the same or similar reference numerals are used for designating same or similar components as in those figures.

An xDSL transceiver module 5.0 comprises an FFT unit 11.0 the output of which is connected to a data output 15.0. A data input 17.0 is connected to the input of a frequency-domain equalizer 13.0. Furthermore, the transceiver module 5.0 comprises a control interface 19.0.

A far-end crosstalk cancellation block 9 comprises N data input ports 21.0 to 21.N, the input ports respectively being connected to one of the transceiver modules 5.0 to 5.N. Similarly, N data output ports 23.0 to 23.N are respectively connected to inputs of one of the transceiver modules 5.0 to 5.N. In FIG. 9 it is shown that the data output 15.0 of the transceiver unit 5.0 is connected to the data input port 21.0 of the crosstalk cancellation block 9, whereas the data output port 23.0 of the crosstalk cancellation block 9 is connected to the data input 17.0 of the transceiver module 5.0. Furthermore, the crosstalk cancellation unit is connected to the control interface 19.0 of the transceiver module 5.0 via a cancellation block control interface 25.

In its internal architecture, as basically already shown in FIG. 4, the cancellation block 9 comprises N input buffers 27.0 to 27.N, each of them being connected to one of the data input ports 21.0 to 21.N and, at its output side, to a processing block 29 for executing a processing as described above. The output of the processing block 29 is connected to an output buffer 31 which, at several outputs, is connected to the data output ports 23.0 to 23.N.

Figure 10:
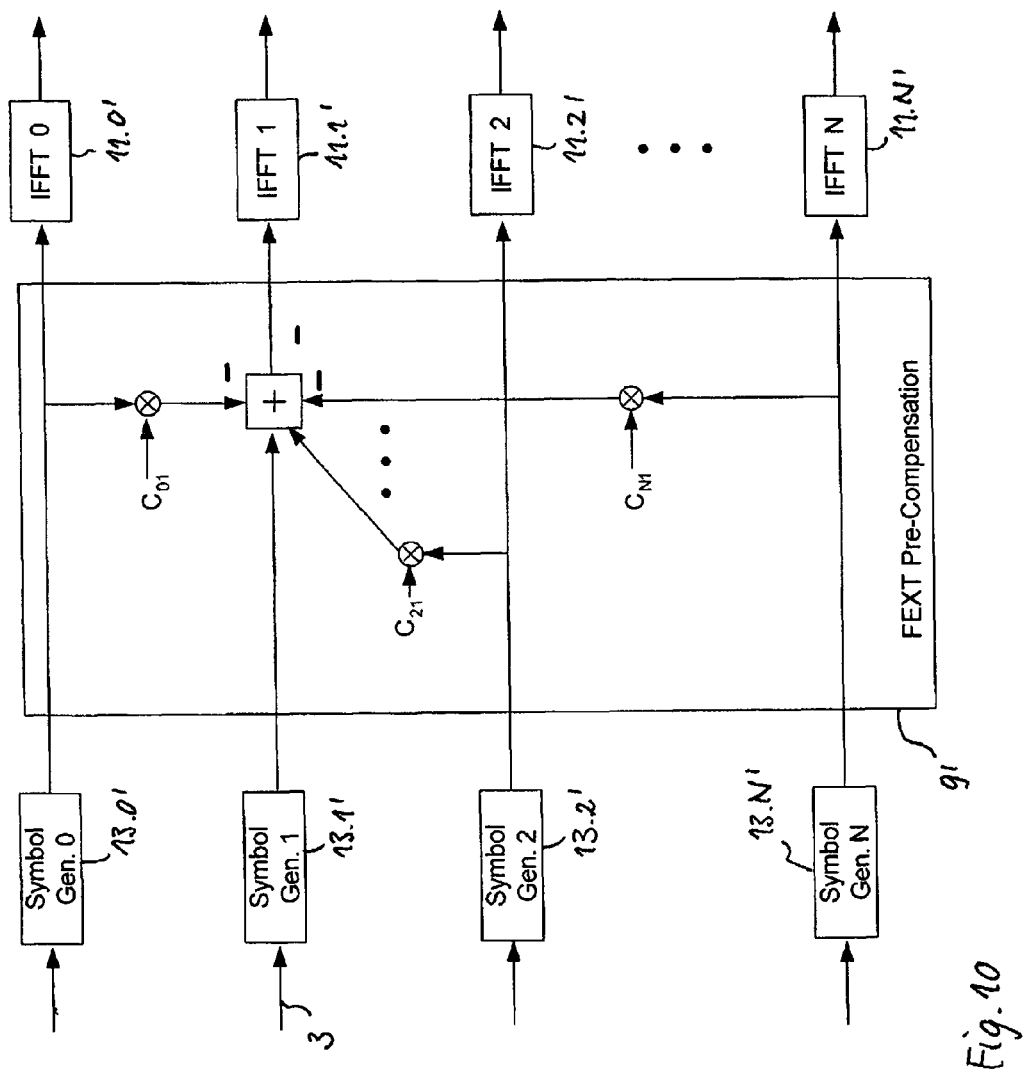
FIG. 10 is a view for explaining the operating principle of a far-end crosstalk pre-compensator, and FIG. 11 a view of the system architecture of that further preferred embodiment.

FIG. 10 illustrates, in a mode very similar to that of FIG. 4, the operating principle of a further preferred embodiment of the invention, comprising a far-end crosstalk pre-compensation block 9', for a subscriber line 3 ("line 1"). Each of the subscriber lines 3 comprises a symbol generator unit 13.0' to 13.N' delivering their output data to the input side of the FEXT pre-compensation block 9'. Inside the FEXT pre-compensation block 9', similar to the embodiment of FIG. 4, multipliers for weighing the signals on the respective lines with the corresponding weighing coefficients $C_{01}$ to $C_{N1}$ are provided, associated to the several lines respectively. Further in similarity to the embodiment of FIG. 4, an adder is associated to the line under consideration, for subtracting the outputs of the symbol generator units from "line 1". At the output side of the FEXT pre-compensation unit 9' inverse Fast Fourier transform units 11.0' to 11.N' are provided for the respective lines. The detailed internal architecture of the FEXT pre-compensation block 9' is conventional.

Figure 11:
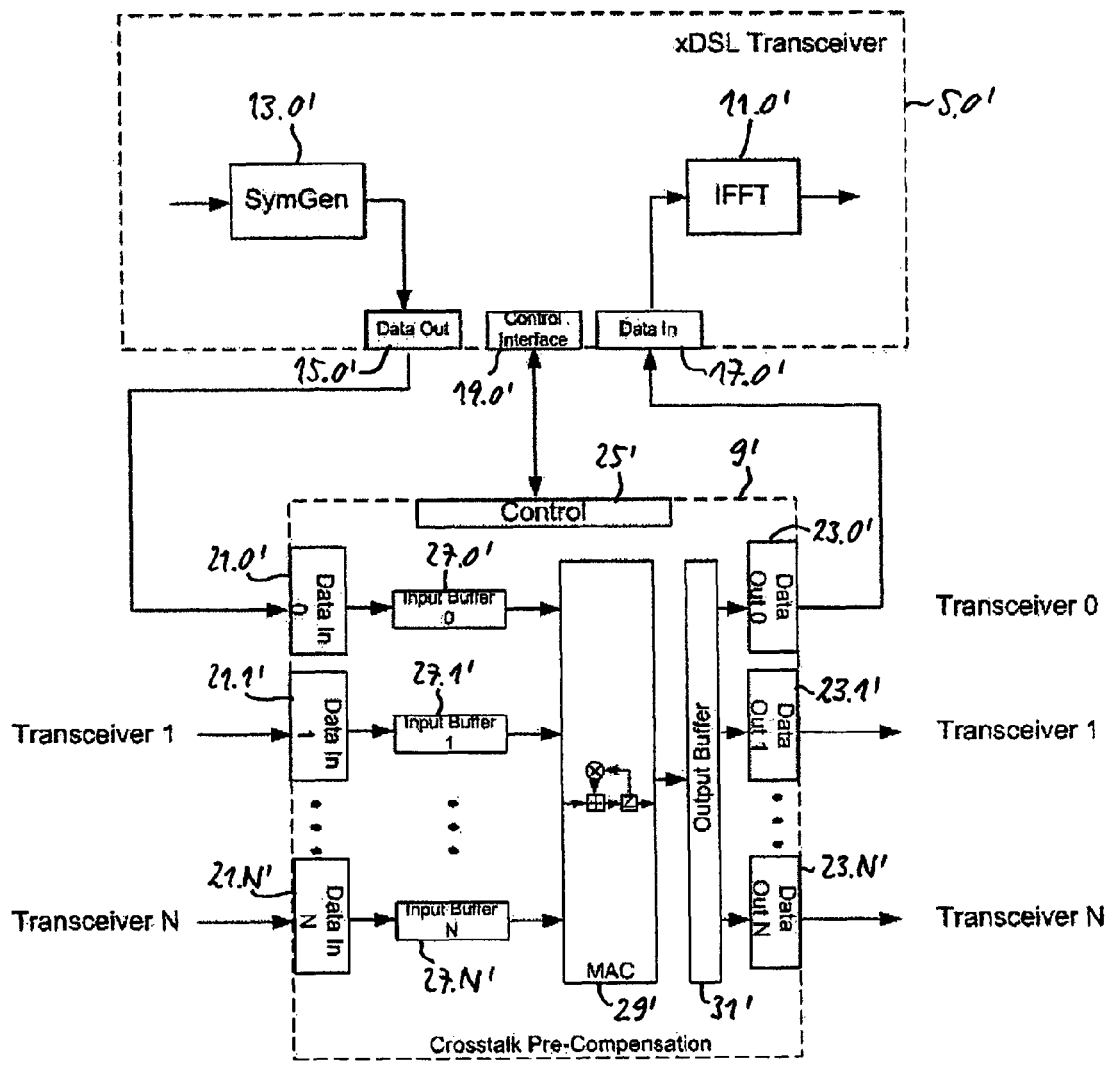

FIG. 11 illustrates, in correspondence to FIG. 9, a further preferred system architecture of a system comprising far-end crosstalk pre-compensation means. As the system architecture is basically "reciprocal" to that of the preceding embodiment, as shown in FIG. 9, the system components are designated with corresponding reference numerals, and it is referred to the description above.

As may be derived from the figure, the signal flow for achieving the FEXT pre-compensation is basically opposite to the signal flow of the previously explained FEXT cancellation. Therefore, the output signal of symbol generator 13.0' exits the xDSL transceiver 5.0' via the data output interface 15.0' thereof and enters into the crosstalk pre-compensation block 9' via the data input 0 thereof, designated with reference numeral 21.0'. In the result of the crosstalk pre-compensation calculations, an output signal exits the FEXT pre-compensation block 9' at its data output 0, designated with reference numeral 23.0', enters into the xDSL transceiver 5.0' at its data input interface 17.0' and is passed into the Inverse Fast Fourier transform unit 11.0' thereof.

As a matter of fact, even the internal structure of the FEXT pre-compensation block 9', including the date inputs and outputs, as well as the input and output buffers and the control interface thereof, is reciprocal to that of the FEXT cancellation unit 9, as described further above.

Many of the above described embodiments provide for an improved telecommunication system comprising far-end crosstalk compensation (FEXT) means or far-end crosstalk pre-compensation means, respectively.

Furthermore, at least some embodiments provide for an improved telecommunication system of the type comprising binders of subscriber lines between switches and user terminals, wherein the user obtains more freedom with respect to his choice regarding improved transmission parameters on one hand and limited costs of the user equipment on the other.

Furthermore, it is an advantage some embodiments of the present invention to provide for an improved telecommunication system of the type comprising binders of subscriber lines between central offices or cabinets, respectively, and a plurality of users, wherein the network owner or operator, respectively, obtains more options with regard to a performance/cost optimization of the network, in particular with respect to the provision of specific performance/coast ratios for predetermined transmission paths or selected end users, respectively.

Furthermore, at least some embodiments of the invention provide for an improved method of operating a telecommunication system, wherein the method comprises a step for reducing the limiting effect of crosstalk phenomena on the system performance, to increase the achievable data rate.

Furthermore, at least some embodiments provide for an improved method of this type, offering the above-mentioned advantages of the improved telecommunication system.

The invention claimed is:

1. An arrangement for use in a telecommunication system, comprising:
   a binder of subscriber lines, each of the subscriber lines operably coupled to one of a plurality of remote user terminals,
   a local transceiver circuit, associated with the binder of subscriber lines and comprising a plurality of substantially identical transceiver modules, each of the transceiver modules being associated to one or a small number of subscriber lines,
   a far-end crosstalk cancellation circuit configured to reduce far-end crosstalk between the subscriber lines of the binder, the far-end crosstalk cancellation circuit operably connected to interface with at least parts of the received data of the respective local transceiver modules, the far-end crosstalk cancellation circuit operable to implement a blind training algorithm for at least one victim subscriber line based on signals received by other transceiver modules.

2. The arrangement of claim 1, wherein the far-end crosstalk cancellation circuit is arranged as a chip-integrated canceller unit that is separate from the transceiver modules.

3. The arrangement of claim 1, wherein each of the transceiver modules at an input side comprises a Fast Fourier Transform unit, an output of the Fast Fourier Transform unit being connected to a data input of the far-end crosstalk cancellation circuit.

4. The arrangement of claim 1, wherein the far-end crosstalk cancellation circuit comprises, for each subscriber line for which far-end crosstalk cancellation is provided:
   a plurality of multipliers for weighing at least a part of input signals received from respective associated transceiver modules with a complex coefficient, and
   a subtracting unit having an input connected to outputs of the multipliers, the subtracting unit configured to subtract the weighed input signals from neighboring lines from the received signal data on the subscriber line which is subject to far-end crosstalk cancellation.

5. The arrangement of claim 1, wherein the system comprises a synchronized DSL system.

6. The arrangement of claim 1, wherein the system comprises a VDSL2 system.

7. An arrangement for use in a telecommunication system, comprising:
   a binder of subscriber lines, each of the subscriber lines operably coupled to one of a plurality of remote user terminals,
   a local transceiver circuit, associated with the binder of subscriber lines and comprising a plurality of substantially identical transceiver modules, each of the modules being associated to one or a small number of subscriber lines,
   a far-end crosstalk pre-compensation circuit configured to pre-compensate far-end crosstalk between the subscriber lines of the binder, the far-end crosstalk pre-compensation configured to interface with at least parts of the transmitted data of the respective local transceiver modules, the far-end crosstalk pre-compensation circuit configure to implement a blind training algorithm for at least one victim subscriber line for training the far-end crosstalk pre-compensation circuit with respect to signals transmitted by the respective other transceiver modules and with information from the remote transceiver of the victim data channel.

8. The arrangement of claim 7, wherein the far-end crosstalk cancellation circuit is arranged as a chip-integrated canceller unit which is separate from transceiver modules.

9. The arrangement of claim 7, each of the transceiver modules at an output side comprises an Inverse Fast Fourier Transform Unit, an input of the inverse Fast Fourier Transform Unit being connected to a data output of the far-end crosstalk pre-cancellation circuit.

10. An arrangement for use in a telecommunication system, comprising:
    a plurality of transmission channels operably coupled to a plurality of user terminals,
    a local transceiver circuit, associated to the plurality of channels and comprising a plurality of substantially identical transceiver modules, each of the modules being associated with one or a small number of channels,
    a far-end crosstalk cancellation circuit configured to at least partly cancel far-end crosstalk between the channels, the far-end crosstalk cancellation circuit associated with at least part of the local transceiver circuit, and wherein a blind training algorithm for at least one victim data channel is implemented for training the far-end crosstalk cancellation circuit with respect to the respective associated transceiver modules.

11. The arrangement of claim 10, wherein the far-end crosstalk cancellation circuit is arranged as a chip-integrated canceller unit which is separate from chip-integrated transceiver modules.

12. The arrangement of claim 10, wherein each of the transceiver modules at an input side comprises a Fast Fourier Transform unit, an output of the Fast Fourier Transform unit being connected to a data input of the far-end crosstalk cancellation circuit.

13. The arrangement of claim 10, wherein the far-end crosstalk cancellation circuit comprises, for each channel for which far-end crosstalk cancellation is provided:
    a plurality of multipliers, each configured to weigh at least a part of an input signal corresponding to at least one other channel with a complex coefficient, and a subtracting unit having an input of which is connected to the outputs of the multipliers.

14. An arrangement for use in a telecommunication system, comprising:
- a binder of data channels, each of the data channels operably coupled to one of a plurality of remote user terminals,
- a local transceiver circuit, associated to the binder of data channels and comprising a plurality of substantially identical transceiver modules, each of the modules being associated with one or a small number of data channels,
- a far-end crosstalk pre-compensation circuit configured to pre-compensate far-end crosstalk between the data channels of the binder, the far-end crosstalk pre-compensation circuit configured to interface with at least parts of the transmitted data of the respective local transceiver modules, the far-end crosstalk pre-compensation circuit configured to implement a blind training algorithm for at least one victim data channel for training the far-end crosstalk pre-compensation circuit with respect to signals transmitted by respective associated transceiver modules and with information from the remote transceiver of the victim data channel.

15. The arrangement of claim 14, each of the transceiver modules at an output side comprises an Inverse Fast Fourier Transform Unit, an input of the inverse Fast Fourier Transform Unit being connected to a data output of the far-end crosstalk cancellation circuit.

* * * * *